United States Patent [19]

Klein

[11] Patent Number: 5,052,780

[45] Date of Patent: Oct. 1, 1991

[54] DICHROIC BEAM SPLITTER

[75] Inventor: Christopher F. Klein, Manhattan Beach, Calif.

[73] Assignee: The Aerospace Corporation, El Segundo, Calif.

[21] Appl. No.: 510,930

[22] Filed: Apr. 19, 1990

[51] Int. Cl.$^5$ .............................................. G02B 27/12
[52] U.S. Cl. ................................... 359/638; 359/900; 359/328
[58] Field of Search ................................ 350/171–173, 350/169–170, 320

[56] References Cited

U.S. PATENT DOCUMENTS 4,504,123  3/1985  Smith .................................... 350/170
4,711,526 12/1987  Hemmings et al. ................. 350/170

Primary Examiner—Bruce Y. Arnold
Assistant Examiner—James Phan
Attorney, Agent, or Firm—William J. Burke

[57] ABSTRACT

A dichroic beam separator is described which is capable of efficiently separating a second and/or third harmonic beam from the residual fundamental beam. Because the device consists of a single uncoated piece of high quality optical glass, it has a high threshold for laser-induced optical damage.

2 Claims, 1 Drawing Sheet

DICHROIC BEAM SPLITTER

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates to optical beam separators, particularly dichroic beam separators which separate the desired second or third harmonic beam from the residual fundamental beam.

2. Description of the Prior Art

A need exists in the laser community for a low-loss, highly damage-resistant, dichroic beam separator (DBS) for the purpose of separating the desired second or third harmonic beam from the residual fundamental beam. There are many situations where a designer might want to reject most of the residual power at the fundamental frequency from a laser operating at a harmonic frequency. For instance, this rejection is necessary in any operational scenario where such radiation must be prevented from striking either the designer's own detector or a remote one. The presence of any significant power at the fundamental will likely preclude any additional system operation at that wavelength by swamping the detector. For example, a pointing and tracking system using a Nd:YAG illuminator laser, which has a fundamental frequency of 1.06 $\mu$m and which operates at the second harmonic, would be unable to detect missile plume emission in the region of 1.06 $\mu$m unless the fundamental was suppressed because the detector would be swamped by the fundamental output of the laser.

The presence of any significant power at the fundamental may also compromise the covertness of an illuminator or range finder operating at a harmonic. For example, a tank, missile, or any other piece of enemy hardware may have tipoff detectors to determine whether the hardware is being illuminated. However, if these detectors operate at the fundamental bands of common lasers, they could not detect the output of a harmonically converted laser whose fundamental output had been suppressed No other devices appear to achieve the minimum optical damage threshold for dichroic separation required by some high-powered laser systems. Referring to FIG. 1, the prior art discloses that a beam 2 exiting laser 4 is separated into a residual fundamental beam 6 and a frequency doubled beam 8 using a thin film dichroic coating 10 deposited on a glass substrate 12. The coating 10 is designed to reflect the harmonic beam and to transmit the fundamental beam. The fundamental beam would then be directed to an absorbing beam dump.

However, there are some shortcomings with this approach. For example, the use of a reflective element sharply changes the optical axis of the system and may limit design flexibility. More importantly, this approach is susceptible to optical damage when used in conjunction with high peak power lasers which operate at power densities in the range of $10^7$ to $10^9$ Watts/sq cm. An alternative to a reflective coating is a transmissive coating. Unfortunately, the transmissive coating is particularly vulnerable to damage from high power lasers because of the greater number of layers associated with this design.

Another prior art approach is the variable ratio beam splitter (VRB) disclosed by Durell in U.S. Pat. No. 4,787,710. The VRB is intended to split a monochromatic beam into two separate beams visible and infrared with a variable intensity ratio. However, the VRB is not able to pass one wavelength while rejecting another. Moreover, the VRB also involves a number of optical elements. This increases the size and weight of the apparatus, as well as the potential for misalignment. In addition, the VRB relies on coated optics which would be damaged by high power lasers.

Therefore, it is the object of the present invention to provide a single element, transmissive device that efficiently separates the fundamental from the harmonics in a beam, while exhibiting a high threshold for optical damage.

SUMMARY OF THE INVENTION

A dichroic beam splitter for use with beams from either low or high power lasers efficiently separates and rejects a fundamental beam and transmits the harmonics with only a minor translation in the optical axis. The device has the important advantage of having a high threshold for optical damage.

DETAILED DESCRIPTION OF THE PREFERRED EMBODIMENT

Figure 1:
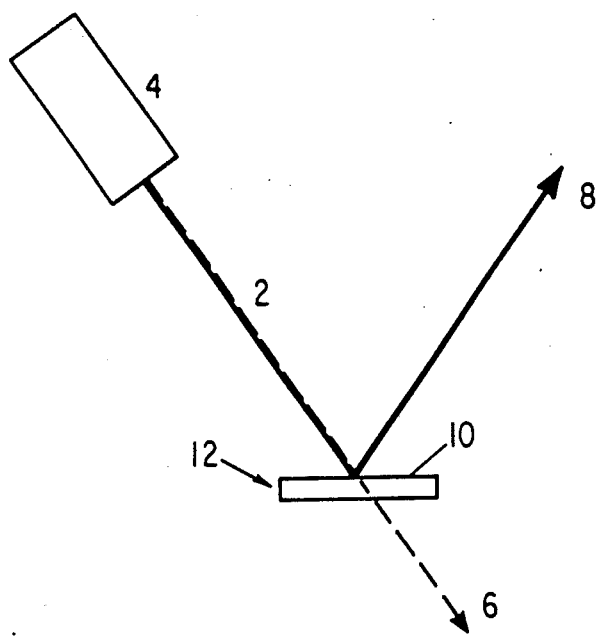
FIG. 1 is a schematic of a prior art apparatus for separating the residual fundamental beam from the harmonic beam.
Figure 2:
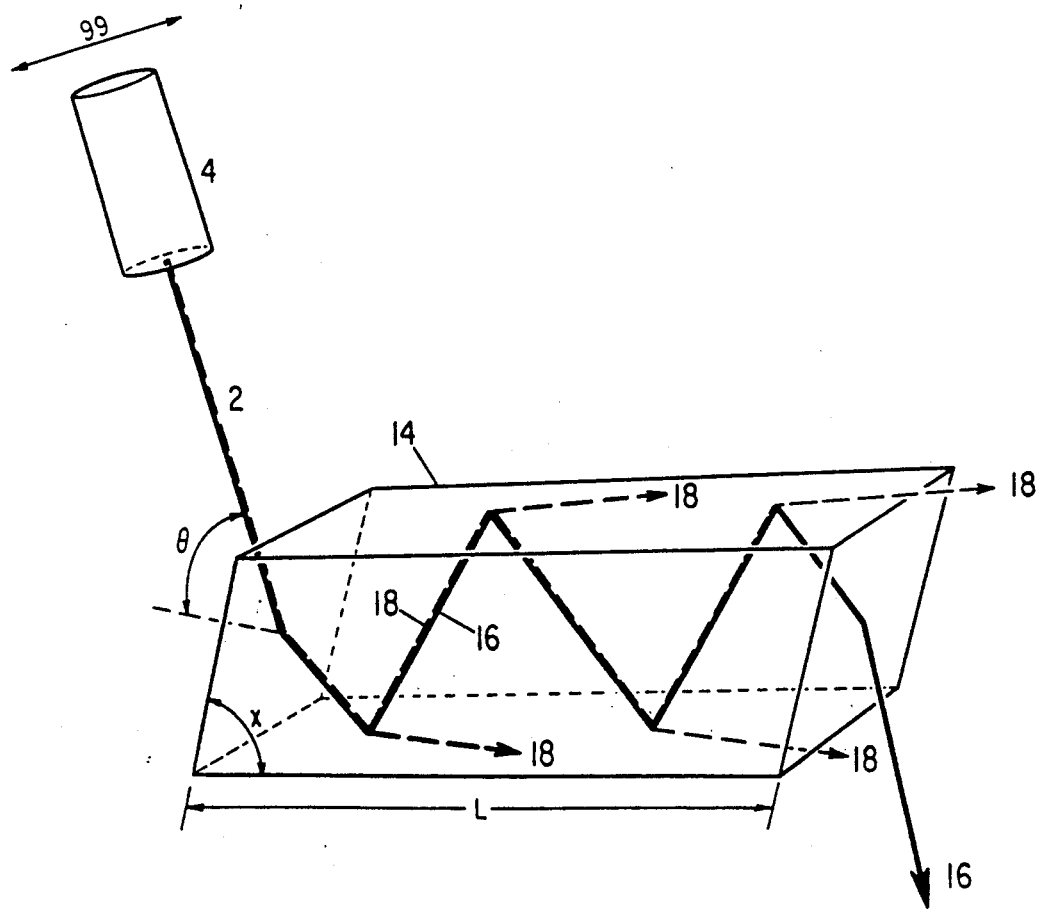
FIG. 2 is a schematic of the present invention.

Referring to an embodiment of the present invention shown schematically in FIG. 2, a combined fundamental and second or third harmonic beam 2 from a laser 4 enters an uncoated glass plate 14 of length L at an angle $\theta$ such that the harmonic beam 16 will experience total internal reflection (TIR) and the fundamental beam 18 will not. After several reflections (from two to four depending upon the type of glass 14), the emerging beam 16 will have at least 90% of the fundamental beam 18 removed through transmission. Subsequent adjustments of length L by the user will either increase or decrease the percentage removal from 90%. The transmitted beam 16 can then be directed into an absorbing glass plate. The incident angle $\theta$ is adjusted by adjusting the laser 4 using adjusting means 99. In a preferred embodiment, laser 4 is mounted on a standard optical table and beam splitter 14 is mounted in a standard angular positioning mount which in turn is mounted on the optical table. Angle $\theta$ is then adjusted by adjusting the beam splitter.

The glass angle x and incident angle $\theta$ of the beam are selected so that the incoming beam 2 enters the glass plate 14 at Brewster's angle so that none of the harmonic beam is lost to reflection. Brewster's angle is defined as the angle of incidence that produces no reflection of the fundamental from the incident surface when the incident light is chosen t have p-polarization, such as is the case here. The device has essentially no loss for the harmonic at the internal reflections.

In addition, because it is uncoated, the glass plate 14 has a high damage threshold compared to coated glass. For example, if Schott BK7 glass is used, as it is for many other optical components, the device will have a damage threshold equal to or exceeding that of all other such components, most of which are coated. It will also have the desired property of being a transmissive device, although some offset to the optical axis of the system will clearly be experienced. The actual amount of offset will be determined by the glass type used and the configuration of the beam separator. Moreover, various folded configurations could be envisioned if needed to eliminate any offset. However, only the basic plate will be considered herein.

Experimental Results

A BK7 DBS was fabricated and tested using a frequency doubled Nd:YAG laser. As illustrated in FIG. 2, the combined beam was directed into the dichroic beam separator (DBS) at Brewster's angle of 56.5 deg. The input and output powers to the DBS were measured for both the fundamental and the second harmonic using a Corning 4-97 filter to separate them. It was found that 97% of the fundamental was rejected by the DBS and all of the second harmonic (to within the limits of our measurement accuracy) was transmitted. Thus, the measured Performance of the device confirmed the analysis.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

I claim:

1. A method of separating an input beam of linearly polarized light into a beam of a fundamental frequency and a beam of harmonics comprising the steps of:
   a. passing the linearly polarized input beam at Brewster's angle into an uncoated parallelepiped glass prism of length L, said prism having an input face and an output face which are parallel to each other and cut at the angle x, measured as illustrated in FIG. 2, such that all the light enters the prism;
   b. selecting the angle x such that, at each reflection at the sides of the prism, the harmonics of input beam experiences total internal reflection and the fundamental does not;
   c. selecting the length of the prism such that there are sufficient reflections that a beam emerging from the output face has at least 90% of the fundamental frequency removed.

2. An apparatus for separating an input beam of linearly polarized light into a beam of a fundamental frequency and a beam of harmonics comprising:
   a. a light source for generating an input beam of linearly polarized light;
   b. an uncoated parallelepiped glass prism of length L, said prism having an input face and an output face which are parallel to each other and cut at the angle x, measured as illustrated in FIG. 2, wherein at each reflection at the sides of the prism, the beam of harmonics experiences total internal reflection and the fundamental does not;
   c. a means for adjusting the incident angle $\theta$ of the input beam on the input face of said prism, such that substantially all of the linearly polarized input beam passes into said prism and a beam emerging from the output face has at least 90% of the fundamental frequency removed.

* * * * *